(12) United States Patent
Pan et al.

(10) Patent No.: US 11,484,155 B2
(45) Date of Patent: Nov. 1, 2022

(54) MATERIAL CLEANING DEVICE AND COOKING APPLIANCE

(71) Applicant: FOSHAN SHUNDE MIDEA ELECTRICAL HEATING APPLIANCES MANUFACTURING CO., LIMITED, Foshan (CN)

(72) Inventors: Dianguo Pan, Foshan (CN); Weijie Chen, Foshan (CN); Xiaokai Liu, Foshan (CN); Ruoyu Mei, Foshan (CN); Ya Zhou, Foshan (CN); Yan She, Foshan (CN); Yuhua Huang, Foshan (CN); Yuehong Qu, Foshan (CN)

( * ) Notice: Subject to any disclaimer, the term of this patent is extended or adjusted under 35 U.S.C. 154(b) by 803 days.

(21) Appl. No.: 16/343,758

(22) PCT Filed: Aug. 21, 2017

(86) PCT No.: PCT/CN2017/098374
§ 371 (c)(1),
(2) Date: Apr. 20, 2019

(87) PCT Pub. No.: WO2018/072549
PCT Pub. Date: Apr. 26, 2018

(65) Prior Publication Data
US 2019/0246845 A1  Aug. 15, 2019

(30) Foreign Application Priority Data
Oct. 20, 2016  (CN) .......................... 201610917502.X (51) Int. Cl.
*A47J 44/00* (2006.01)
*B08B 3/10* (2006.01)
(Continued)

(52) U.S. Cl.
CPC ............. *A47J 44/00* (2013.01); *A47J 27/002* (2013.01); *B08B 3/102* (2013.01); *B08B 3/104* (2013.01); *B08B 9/0804* (2013.01)

(58) Field of Classification Search
CPC ........ A47J 44/00; A47J 27/002; A47J 31/002; A47J 31/60; A47J 43/07; A47J 31/58; A47J 43/0716; A47J 43/0727
(Continued)

(56) References Cited

U.S. PATENT DOCUMENTS

2010/0323071 A1* 12/2010 Nevarez ............... B67D 1/0051
241/37.5
2012/0026826 A1* 2/2012 Broadbent .......... A47J 43/0716
366/192

FOREIGN PATENT DOCUMENTS

CN         2105236 U    5/1992
CN       201939091 U    8/2011
(Continued)

OTHER PUBLICATIONS

International Search Report dated Nov. 27, 2017 in the corresponding PCT application (application No. PCT/CN2017/098374).
(Continued)

*Primary Examiner* — Phuong T Nguyen
(74) *Attorney, Agent, or Firm* — Kilpatrick Townsend & Stockton, LLP (57) ABSTRACT

A material cleaning device and a cooking appliance. The material cleaning device comprises: a cleaning chamber, an air inlet, a material inlet, and a water inlet being provided on the cleaning chamber, the air inlet, the material inlet, and the water inlet being respectively used for transporting air flows, a material to be cleaned, and water for cleaning the material to the cleaning chamber; and a stirring assembly provided in the cleaning chamber and being capable of rotating in the cleaning chamber under the action of the air streams, so as
(Continued)

to stir the material and the water in the cleaning chamber. The material cleaning device drives the stirring assembly to rotate by means of air streams, so as to make the stirring assembly stir the material and the water in the cleaning chamber, thereby implementing automatic cleaning. The material cleaning device features a simple structure, and is easy to use.

16 Claims, 7 Drawing Sheets

(51) Int. Cl.
*A47J 27/00* (2006.01)
*B08B 9/08* (2006.01)
(58) Field of Classification Search
USPC .......... 99/348, 359, 485; 426/231, 416, 463, 426/486, 519, 524
See application file for complete search history.

(56) References Cited

FOREIGN PATENT DOCUMENTS

| | | |
|---|---|---|
| CN | 103431786 A | 12/2013 |
| CN | 103720336 A | 4/2014 |
| CN | 103815770 A | 5/2014 |
| CN | 104207624 A | 12/2014 |
| JP | S63125225 A | 5/1988 |
| JP | 2011110205 A | 6/2011 |
| WO | 2011146982 A1 | 12/2011 |

OTHER PUBLICATIONS

OA for JP Application No. 2019-521002.

* cited by examiner

MATERIAL CLEANING DEVICE AND COOKING APPLIANCE

PRIORITY CLAIM AND RELATED APPLICATION

The present disclosure is a national phase application of International Application No. PCT/CN2017/098374, filed on Aug. 21, 2017, which claims the priority of the Chinese patent application No. 201610917502.X, filed with the Chinese Patent Office on Oct. 20, 2016 and entitled "Material Cleaning Device and Cooking Appliance", which is incorporated herein by reference in its entirety.

TECHNICAL FIELD

The present disclosure relates to the field of cooking appliances, and particularly to a material cleaning device and a cooking appliance comprising the material cleaning device.

BACKGROUND

At present, the intelligent cooking appliances, such as automatic electric cookers, have the problem that rice cannot be washed automatically, the structure for rice washing is complicated and inconvenient to use, or the like, which affects the user experience of the products.

SUMMARY

An embodiment of a first aspect of the present disclosure provides a material cleaning device, comprising: a cleaning chamber, an air inlet, a material inlet, and a water inlet being provided on the cleaning chamber, the air inlet, the material inlet, and the water inlet being respectively used for transporting air flows, a material to be cleaned, and water for cleaning the material to the cleaning chamber; and a stirring assembly provided in the cleaning chamber and being capable of rotating in the cleaning chamber under the action of the air streams, so as to stir the material and the water in the cleaning chamber.

For the material cleaning device provided by the embodiment of the first aspect of the present disclosure, the stirring assembly is driven to rotate by means of air streams, so as to stir the material and the water in the cleaning chamber, thereby implementing automatic cleaning, which is an ingenious design, is simple in structure, and is easy to use. Specifically, the cleaning chamber is provided with an air inlet, a material inlet and a water inlet, air flows are transported to the cleaning chamber through the air inlet, a material to be cleaned is transported to the cleaning chamber through the material inlet, water for cleaning the material is transported to the cleaning chamber through the water inlet, then the materials such as rice and water can rotate and tumble under the action of the stirring assembly, thus achieving the object of automatic cleaning, which leads to good cleaning effect, and is simple in structure.

In addition, the material cleaning device in the above-described embodiment provided by the present disclosure may further have the following additional technical features:

In the above-described technical solution, the stirring assembly comprises: a rotating member disposed in the cleaning chamber and being capable of rotating in the cleaning chamber under the action of the air streams; and a stirring member disposed in the cleaning chamber, connected to the rotating member and used for rotating in the cleaning chamber under the driving of the rotating member, so as to stir the material and the water in the cleaning chamber.

The stirring assembly comprises a stirring member and a rotating member, the rotating member is capable of converting wind energy into mechanical energy to drive the stirring assembly to rotate in the cleaning chamber, and the stirring member can contact the material and exert a stirring force on the material and the water to rotate and tumble the material and the water, thereby achieving the object of cleaning.

In any of the above-described technical solutions, the material cleaning device further comprises: a bracket disposed in the cleaning chamber, fixedly connected to an inner sidewall of the cleaning chamber, and used for supporting the stirring assembly, the stirring assembly being rotatable relative to the bracket.

By providing a bracket in the cleaning chamber to support the stirring assembly such as the rotating member and the stirring member, on the one hand, it is ensured that the rotating member and the stirring member can rotate stably in the cleaning chamber, and on the other hand, it is possible to ensure, by reasonably arranging the position of the bracket, that the rotating member and the stirring member are in proper positions, thereby ensuring that the stirring assembly can maintain a reasonable rotational speed and effectively stir the material and the water.

In any of the above-described technical solutions, the bracket is provided with a first connecting hole; and the stirring member comprises: a connecting rod partially located in the first connecting hole and rotatable in the first connecting hole, the connecting rod being connected to the rotating member so that the rotating member can rotate relative to the bracket with the connecting rod as a shaft; and a stirring rod connected to the connecting rod, extending in a different direction from the connecting rod, and used for stirring the material and the water in the cleaning chamber.

The stirring member comprises a connecting rod and a stirring rod, and the connecting rod is connected to the rotating member, realizing the connection between the stirring member and the rotating member, and ensuring that the rotating member can drive the stirring member to rotate. Moreover, the connecting rod is partially located in the first connecting hole on the bracket, so the rotating member can rotate relative to the bracket with the connecting rod as the shaft, thus effectively ensuring the rotation stability of the rotating member and avoiding deviation and the like, and also ensuring that the stirring rod can rotate stably in the cleaning chamber to rotate and tumble the material and the water relatively regularly. In this way, the function of automatic cleaning is realized, and excessive noise is avoided.

As for the specific connection relationship between the connecting rod and the rotating member, the connection may be fixed connection, and in this way, the rotating member and the stirring member can rotate synchronously, so that the stirring member can quickly stir the material and the water, thereby improving the cleaning efficiency of the material cleaning device. Of course, the connecting rod may also be movable connected to the rotating member, as long as the rotating member can drive the connecting rod to rotate, i.e., the rotation of the stirring member, and thus the stirring function, can be realized.

In any of the above-described technical solutions, the connecting rod longitudinally passes through the first connecting hole, and upper and lower ends of the connecting rod are connected to the rotating member and the stirring rod, respectively; or, an upper end of the connecting rod protrudes from the first connecting hole, the rotating member and the stirring rod are both connected to an upper portion of the connecting rod, and the stirring rod is located below the rotating member.

The connecting rod longitudinally passes through the first connecting hole, and the upper and lower ends of the connecting rod are connected to the rotating member and the stirring rod, respectively, so that the rotating member and the stirring rod are located on the upper and lower sides of the bracket, respectively, specifically with the rotating member being on the upper side, and the stirring rod on the lower side. In this way, on the one hand, the rotating member is prevented from contacting the material and the water, thereby avoiding the resistance caused by the material and the water to the rotation of the rotating member; and on the other hand, it is ensured that the stirring rod can contact the material and the water, and further effectively stir the water and the material, so as to ensure the cleaning effect of the material cleaning device.

The upper end of the connecting rod protrudes from the first connecting hole, the rotating member and the stirring rod are both connected to the upper portion of the connecting rod, and the stirring rod is located below the rotating member, so that both the rotating member and the stirring rod are located on the upper side of the bracket, which is also the case where the rotating member is on the upper side, and the stirring rod is on the lower side. In this way, it is also possible to prevent the rotating member from contacting the material and the water, thereby avoiding the resistance caused by the material and the water to the rotation of the rotating member; and further, it can also be ensured that the stirring rod can contact the material and the water, and further effectively stir the water and the material, so as to ensure the cleaning effect of the material cleaning device.

In any of the above-described technical solutions, the rotating member is provided with a second connecting hole, and a sidewall of the second connecting hole is provided with a limiting groove; a first limiting bump is formed on the upper end of the connecting rod, and the first limiting bump is inserted into the second connecting hole, is clamped in the limiting groove, and is supported on a groove bottom of the limiting groove, so that the connecting rod is fixedly connected with the rotating member.

The limiting groove cooperates with the first limiting bump, realizing the fixed connection between the connecting rod and the rotating member, which leads to a simple structure and convenient assembly. Specifically, during assembly, the rotating member is supported on the bracket, and the second connecting hole on the rotating member is made to communicate with the first connecting hole on the bracket; then the stirring member is installed from bottom to top, so that the connecting rod of the stirring member is inserted into the first connecting hole and the second connecting hole sequentially from bottom to top; and finally the connecting rod is rotated, so that the first limiting bump on the connecting rod is clamped in the limiting groove, in this case, the limiting groove can limit both the rotation of the connecting rod in the second connecting hole and the downward movement of the connecting rod, that is, the limiting groove not only limits the position of the connecting rod, but also supports the connecting rod, thereby ensuring the reliable connection between the rotating member and the stirring member, ensuring that the rotating member and the stirring member can rotate synchronously, and further improving the use reliability of the device.

In any of the above-described technical solutions, the lower end of the connecting rod protrudes from the first connecting hole, and the lower end of the connecting rod is formed with a second limiting bump having a larger cross-sectional area than the first connecting hole.

The lower end of the connecting rod protrudes from the first connecting hole, i.e., whether the stirring rod is connected to the upper portion or the lower portion of the connecting rod, the connecting rod always longitudinally passes through the first connecting hole, which maximizes the depth of insertion of the connecting rod into the first connecting hole, thereby effectively avoiding inclination of the connecting rod, etc., and further improving the stability of the stirring member and the rotating member when rotating. The arrangement of the second limiting bump can limit the upward movement of the connecting rod, which further ensures the relative stability between the connecting rod and the bracket, thereby further ensuring the stable supporting of the stirring assembly by the bracket, and further ensuring the relative stability between the stirring member and the rotating member and ensuring that the stirring member and the rotating member can rotate stably. In addition, for the technical solution in which the stirring rod is connected to the lower end of the connecting rod, the stirring rod can be directly connected to the limiting bump, which is simple in structure and is an ingenious design.

In any of the above-described technical solutions, the stirring rod extends in a direction close to the bottom of the inner sidewall of the cleaning chamber.

The extending of the stirring rod in a direction close to the bottom of the inner sidewall of the cleaning chamber increases the stirring depth and the stirring radius of the stirring rod, and effectively increases the stirring range of the stirring rod, so that the stirring rod can stir more materials and water, thus further improving the cleaning effect of the material cleaning device.

In any of the above-described technical solutions, there are a plurality of stirring rods, and the plurality of stirring rods each form a different angle with the connecting rod.

As there are a plurality of stirring rods and the plurality of stirring rods each form a different angle with the connecting rod, the plurality of stirring rods each have a different stirring radius, which further increases the material and the water the stirring rod can stir, and enables the material and the water to tumble while rotating, thereby further improving the cleaning effect of the material cleaning device.

In any of the above-described technical solutions, the bracket comprises: a support column, by which the stirring assembly is supported and in which the first connecting hole is provided; and a support rib having one end connected to the support column and the other end fixedly connected to the inner sidewall of the cleaning chamber.

The bracket comprises a support column and a support rib. The support column is capable of supporting the stirring assembly such as the rotating member and the stirring member, thereby realizing the supporting function of the bracket; the first connecting hole is provided in the support column, and the connecting rod is partially located in the first connecting hole, ensuring that the rotating member can rotate relative to the bracket with the connecting rod as the shaft, thereby ensuring the reliable connection between the stirring assembly and the bracket; and one end of the support rib is connected to the support column and the other end thereof is fixedly connected to the inner sidewall of the cleaning chamber, realizing the fixed connection between the bracket and the cleaning chamber.

In any of the above-described technical solutions, the support column, the support rib and the cleaning chamber are a one-piece structure; and/or there are a plurality of support ribs, and the plurality of support ribs are uniformly distributed in a circumferential direction of the support column.

The support column, the support rib and the cleaning chamber are a one-piece structure, which, on the one hand, improves the connection strength between the support column and the support rib and the connection strength between the support rib and the cleaning chamber, and reduces the probability that the bracket will fall off or break, thereby further improving the use reliability of the material cleaning device; and on the other hand, improves the production efficiency of the product and reduces the production cost of the product, as the support column, the support rib and the cleaning chamber can be integrally formed.

There are a plurality of support ribs, and the plurality of support ribs are uniformly distributed in a circumferential direction of the support column, which further improves the strength and supporting stability of the bracket.

In any of the above-described technical solutions, the rotating member comprises: a connecting column connected to the stirring member and being capable of being supported by the bracket; and a blade connected to the connecting column and being capable of converting wind energy into mechanical energy to enable the rotating member to rotate relative to the bracket.

The rotating member comprises a connecting column and a blade, and the connecting column is connected to the stirring member and is supported by the bracket, realizing the assembly relationship between the rotating member and the bracket and between the rotating member and the stirring member; and the blade is connected to the connecting column and can convert wind energy into mechanical energy, realizing the air stream driving function of the rotating member.

In any of the above-described technical solutions, there are a plurality of blades, and the plurality of blades are uniformly distributed in a circumferential direction of the connecting column; and/or a windward side of the blade is a cambered surface.

There are a plurality of blades, ensuring that the rotating member can rotate continuously and efficiently; and the plurality of blades are uniformly distributed in a circumferential direction of the connecting column, effectively ensuring the rotation stability of the rotating member.

The windward side of the blade is a cambered surface, which increases the area of the blade and thereby increases the rotational speed of the blade.

In one embodiment, one end of the blade away from the connecting column and/or an upper end of the blade are/is bent towards the windward side of the blade, so that the windward side of the blade is a cambered surface.

One end of the blade away from the connecting column is bent towards the windward side of the blade, enabling each part of the windward side to effectively receive the blowing of the air streams, and reducing the air resistance received by the blade when rotating, thereby further improving the rotational speed of the blade; and the upper end of the blade is bent towards the windward side of the blade, which can have certain guiding effect, so that the air streams on the upper portion of the blade can be deflected downwardly and exert certain impact on the material, thereby further improving the working efficiency of the material cleaning device.

In any of the above-described technical solutions, the bottom of the cleaning chamber is provided with a material outlet; and the material cleaning device further comprises a valve connected to the cleaning chamber and movable relative to the cleaning chamber to close or open the material outlet.

The arrangement of the material outlet and the valve facilitates the automatic discharge after the completion of material cleaning, thereby further improving the automation degree of the material cleaning device and further increasing the market competitiveness of the product. Specifically, in the cleaning process, the valve is kept closed, and the material and the water rotate and tumble in the cleaning chamber to realize automatic cleaning; and after the completion of the cleaning, the valve moves relative to the cleaning chamber to open the material outlet, and the material is discharged through the material outlet under the action of gravity to realize automatic discharge.

In any of the above-described technical solutions, the bottom of the cleaning chamber is completely opened to form the material outlet.

The bottom of the cleaning chamber is completely opened to form the material outlet, which maximizes the size of the material outlet, thereby significantly increasing the material discharge speed of the material cleaning device.

In any of the above-described technical solutions, a sealing member for sealing the material outlet is further provided between the valve and the cleaning chamber.

The arrangement of the sealing member effectively ensures the sealing connection between the valve and the cleaning chamber, thereby preventing the air streams or water from leaking to the outside through the joint between the valve and the cleaning chamber, and further improving the use reliability of the device.

In any of the above-described technical solutions, the sealing member is a sealing ring.

The sealing member is a sealing ring, and the sealing ring is reliable in sealing and low in price.

In any of the above-described technical solutions, the top of the cleaning chamber is completely open; and the material cleaning device further comprises a cleaning cover being capable of covering the cleaning chamber so as to close the cleaning chamber.

The top of the cleaning chamber is completely open, facilitating the assembly, repair and replacement of the stirring assembly.

In any of the above-described technical solutions, the air inlet coincides with the material inlet or the water inlet.

The air inlet coincides with the material inlet or the water inlet, that is, the air inlet shares a single inlet with the material inlet, or the air inlet shares a single inlet with the water inlet, which simplifies the structure of the cleaning chamber and is beneficial to product cost saving.

It should be explained that, since the material cleaning device of the present disclosure mainly utilizes air streams to drive the stirring assembly to rotate so as to realize the stirring of the material and the water, there is no strict requirement on the order of the transport of the material and the water into the cleaning chamber, and it is only required that after the material and the water are transported into the cleaning chamber, air streams can enter the cleaning chamber and drive the stirring assembly to rotate; and as to whether the air streams are transported therein through a special air inlet, through the material inlet (i.e. the air inlet shares a single inlet with the material inlet), or through the water inlet (i.e. the air inlet shares a single inlet with the water inlet), it makes no difference, and they can all achieve the object of the present disclosure.

It should be noted that, for the technical solution in which the air inlet shares a single inlet with the material inlet, pneumatic feeding can also be realized, i.e., the material is fed into the cleaning chamber by means of the air streams, which has high feeding efficiency, and is clean and pollution-free. For the order of transport of the air streams and the material, it is feasible to first transport the material through the material inlet, and then transport the air streams through the material inlet for cleaning; and it is also feasible to transport the material and the air streams simultaneously, i.e., the material is transported into the cleaning chamber under the action of the air streams, and then the water and the material rotate and tumble under the action of the air streams to realize automatic cleaning. The latter is preferable, and in this way, in the process of transporting the material into the cleaning chamber under the action of the air streams, tumbling and rubbing will also occur to the material under the action of the air streams, so that particles such as starch adhered to the surface of the material will partially fall off, i.e., the air stream feeding has certain dry cleaning effect on the material, thereby further improving the material cleaning effect of the material cleaning device.

In any of the above-described technical solutions, the cleaning chamber is further provided with an air outlet and a water outlet.

The arrangement of the air outlet can prevent the air pressure in the cleaning chamber from being too high, so that high-pressure air streams can be continuously introduced into the cleaning chamber, thereby ensuring the cleaning effect of the device. The arrangement of the water outlet makes it convenient to automatically discharge the water after the completion of the cleaning, and the water outlet is kept in the closed state during the cleaning process, which not only can prevent loss of the air streams, but also can avoid the use of a large amount of water.

In any of the above-described technical solutions, the air outlet is porous; and/or the water outlet is porous; and/or the air inlet, the water inlet, the air outlet and the water outlet are all provided on the sidewall of the cleaning chamber; and/or the material inlet is located at the upper portion of the cleaning chamber.

The air outlet is porous, and the pore diameter of the air outlet is smaller than the particle diameter of the material in the cleaning chamber, which not only ensures normal air exhaust of the cleaning chamber, but also prevents the material from being discharged from the air outlet, thus further improving the use reliability of the device. The water outlet is porous, and the pore diameter of the water outlet is smaller than the particle diameter of the material in the cleaning chamber, which not only ensures normal water drainage of the cleaning chamber, but also prevents the material from being discharged from the water outlet. The air inlet, the water inlet, the air outlet and the water outlet are all provided on the sidewall of the cleaning chamber, which is simple in structure, facilitates the overhaul of the device and also does not affect automatic material discharge of the device. The material inlet is located at the upper portion of the cleaning chamber, which can prevent the water in the cleaning chamber from pouring into the material inlet. In the specific use process, at the time of cleaning the material, the air outlet is opened and the water outlet is closed so as to reduce the loss of air streams, and use of a large amount of water can also be avoided; and when cleaning has been completed, the air outlet is closed and the water outlet is opened, so that the water can be discharged under the action of gravity and the air streams.

An embodiment of a second aspect of the present disclosure provides a cooking appliance, comprising the material cleaning device as described in any of the embodiments of the first aspect.

The cooking appliance provided in the embodiment of the second aspect of the present disclosure comprises the material cleaning device as described in any of the embodiments of the first aspect, and therefore has all the advantageous effects of any of the above-described embodiments, which will not be repeated here.

In the above-described technical solutions, the cooking appliance further comprises: a pot body and a cover body, the cover body being capable of covering the pot body so as to form a cooking chamber, wherein the material cleaning device is provided on the cover body and used for cleaning a material fed into the cleaning chamber thereof, and feeding the cleaned material into the cooking chamber.

The cooking appliance comprises a pot body, a cover body and the material cleaning device, then after cleaning the material, the material cleaning device can directly feed the material into the cooking chamber, thereby effectively improving the intellectualization degree and the automation degree of the cooking appliance, and further improving the use experience of the user.

In any of the above-described technical solutions, the cooking appliance is an electric cooker.

Of course, the cooking appliance is not limited to an electric cooker, but may also be an electric pressure cooker or other cooking appliances.

Additional aspects and advantages of the present disclosure will become obvious from the following description, or learned by the practice of the present disclosure.

BRIEF DESCRIPTION OF DRAWINGS

The above-mentioned and/or additional aspects and advantages of the present disclosure will become apparent and be understood easily from the following description of the embodiments made in conjunction with the accompanying drawings, in which.

The correspondence relationship between the reference signs in FIGS. 1-14 and the components is as follows:

1 material cleaning device, 10 cleaning chamber, 11 material inlet, 12 water inlet, 13 air outlet, 14 water outlet, 20 stirring assembly, 21 rotating member, 211 connecting column, 2111 second connecting hole, 2112 limiting groove, 212 blade, 22 stirring member, 221 connecting rod, 2211 first limiting bump, 2212 second limiting bump, 222 stirring rod, 30 bracket, 31 support column, 311 first connecting hole, 32 support rib, 40 valve, 50 sealing ring, 60 cleaning cover, 2 electric cooker, 210 pot body, and 220 cover body.

DETAILED DESCRIPTION OF EMBODIMENTS

A further detailed description of the present disclosure will be given below in connection with the accompanying drawings and specific embodiments. It should be noted that the embodiments of the present disclosure and the features of the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

A material cleaning device and a cooking appliance according to some embodiments of the present disclosure are described below with reference to FIGS. 1-14.

As shown in FIGS. 1-14, the material cleaning device 1 provided in an embodiment of the first aspect of the present disclosure comprises: a cleaning chamber 10 and a stirring assembly 20.

Specifically, the cleaning chamber 10 is provided with an air inlet, a material inlet 11, and a water inlet 12, the air inlet, the material inlet 11, and the water inlet 12 are respectively used for transporting air flows, a material to be cleaned, and water for cleaning the material to the cleaning chamber 10; and the stirring assembly 20 is provided in the cleaning chamber 10 and capable of rotating in the cleaning chamber 10 under the action of the air streams, so as to stir the material and the water in the cleaning chamber 10.

For the material cleaning device 1 provided by the embodiment of the first aspect of the present disclosure, the stirring assembly 20 is driven to rotate by means of air streams, so as to make the stirring assembly 20 stir the material and the water in the cleaning chamber 10, thereby implementing automatic cleaning, which is an ingenious design, is simple in structure, and is easy to use. Specifically, the cleaning chamber 10 is provided with an air inlet, a material inlet 11 and a water inlet 12, air flows are transported to the cleaning chamber 10 through the air inlet, a material to be cleaned is transported to the cleaning chamber 10 through the material inlet 11, water for cleaning the material is transported to the cleaning chamber 10 through the water inlet 12, then the materials such as rice and water can rotate and tumble under the action of the stirring assembly 20, thus achieving the object of automatic cleaning, which leads to good cleaning effect, and is simple in structure.

In some embodiments of the present disclosure, as shown in FIGS. 1-6, the stirring assembly 20 comprises: a rotating member 21 and a stirring member 22, wherein the rotating member 21 is disposed in the cleaning chamber 10 and capable of rotating in the cleaning chamber 10 under the action of the air streams; and the stirring member 22 is disposed in the cleaning chamber 10, connected to the rotating member 21 and used for rotating in the cleaning chamber 10 under the driving of the rotating member 21, so as to stir the material and the water in the cleaning chamber 10.

Further, as shown in FIGS. 1, 3, 4, 5, 6, 7 and 8, the material cleaning device 1 further comprises: a bracket 30 disposed in the cleaning chamber 10, fixedly connected to an inner sidewall of the cleaning chamber 10, and used for supporting the stirring assembly 20, the rotating member 21 being rotatable relative to the bracket 30.

In the above-described embodiments, the stirring assembly 20 comprises a stirring member 22 and a rotating member 21, the rotating member 21 is capable of converting wind energy into mechanical energy to drive the stirring assembly 20 to rotate in the cleaning chamber 10, and the stirring member 22 can contact the material and exert a stirring force on the material and the water to rotate and tumble the material and the water, thereby achieving the object of cleaning.

By providing a bracket 30 in the cleaning chamber 10 to support the stirring assembly 20 such as the rotating member 21 and the stirring member 22, on the one hand, it is ensured that the rotating member 21 and the stirring member 22 can rotate stably in the cleaning chamber 10, and on the other hand, it is possible to ensure, by reasonably arranging the position of the bracket 30, that the rotating member 21 and the stirring member 22 are in proper positions, thereby ensuring that the stirring assembly 20 can maintain a reasonable rotational speed and effectively stir the material and the water.

Figure 5:
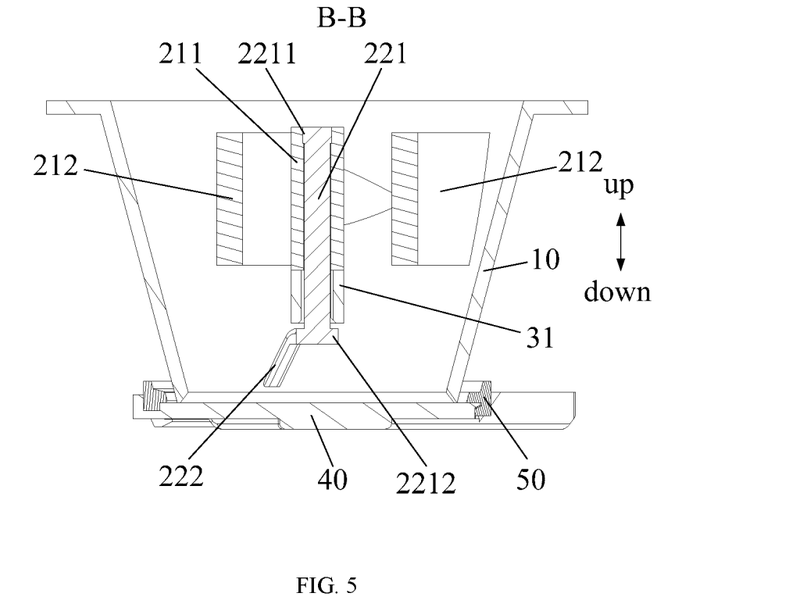
FIG. 5 is a schematic sectional view taken in the direction B-B in FIG. 4.
Figure 6:
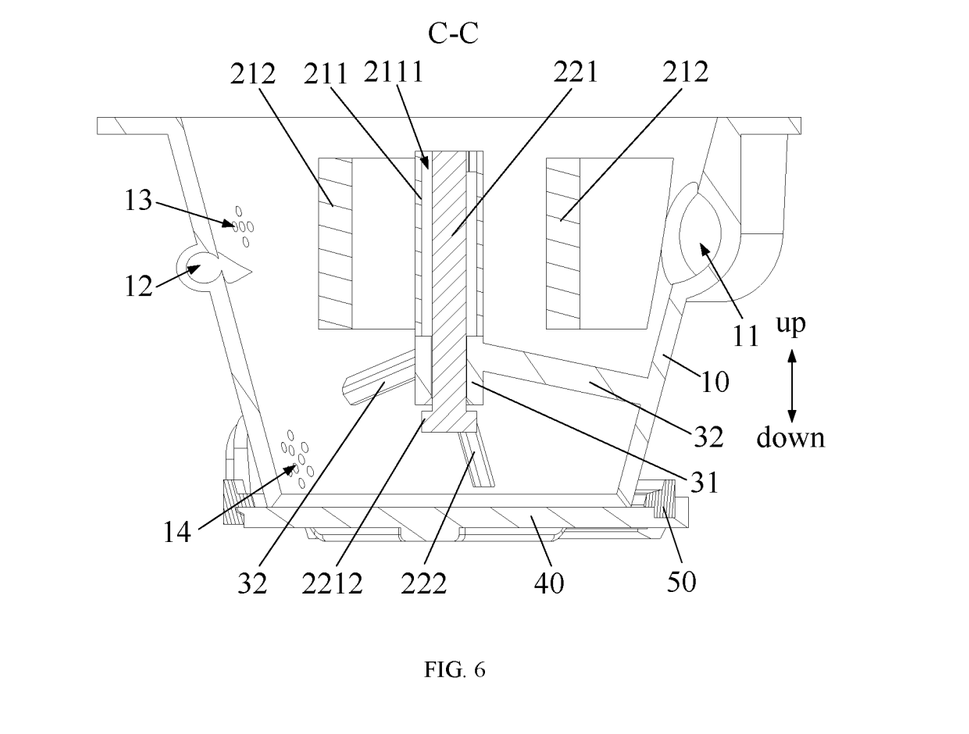
FIG. 6 is a schematic sectional view taken in the direction C-C in FIG. 4.
Figure 7:
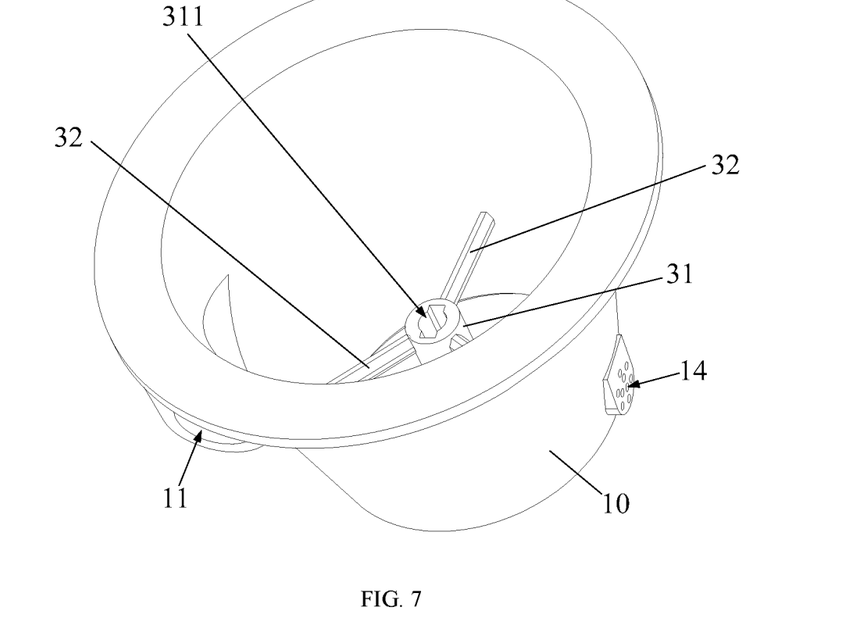
FIG. 7 is a schematic structural view of a cleaning chamber and a bracket in FIG. 1.
Figure 8:
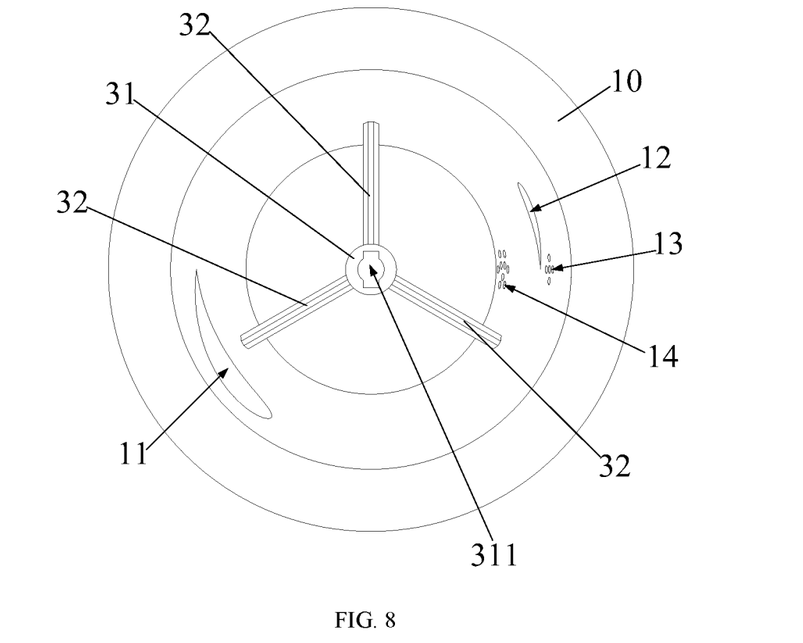
FIG. 8 is a schematic top view of the structure shown in FIG. 7.
Figure 9:
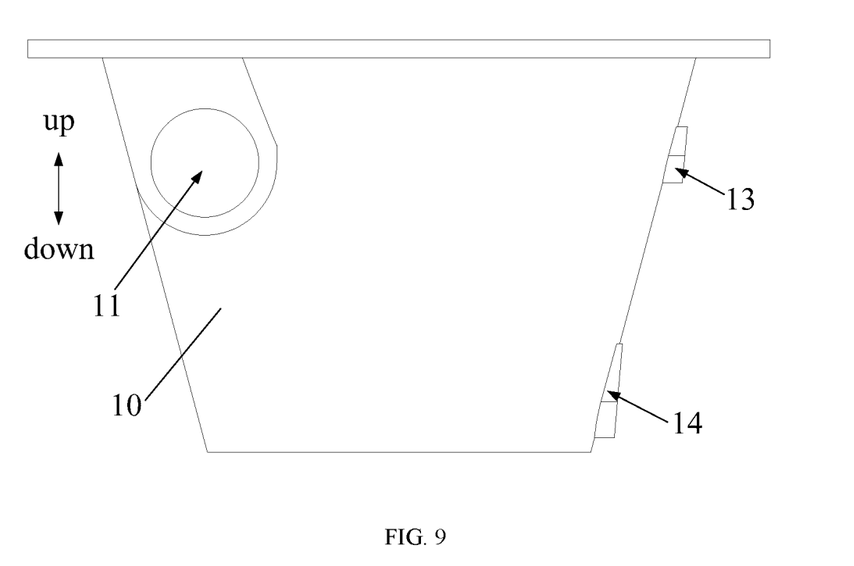
FIG. 9 is a schematic front view of the structure shown in FIG. 7.
Figure 10:
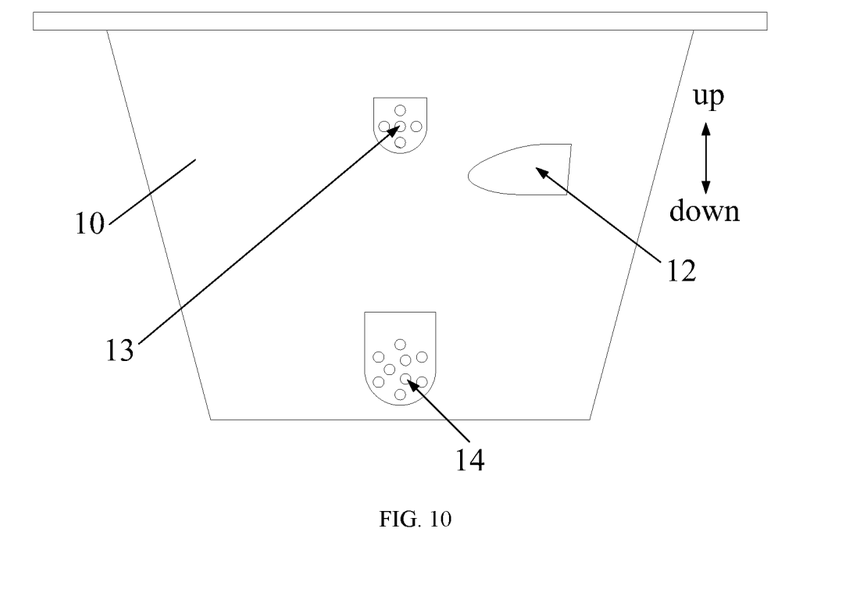
FIG. 10 is a right-side view of the structure shown in FIG. 7.

In some embodiments of the present disclosure, further, the bracket 30 is provided with a first connecting hole 311, as shown in FIGS. 7 and 8; and the stirring member 22 comprises: a connecting rod 221 and a stirring rod 222, as shown in FIGS. 1-6.

In the above, as shown in FIGS. 5 and 6, the connecting rod 221 is partially located in the first connecting hole 311 and rotatable in the first connecting hole 311, the connecting rod 221 is connected to the rotating member 21 so that the rotating member 21 can rotate relative to the bracket 30 with the connecting rod 221 as a shaft; and the stirring rod 222 is connected to the connecting rod 221, extends in a different direction from the connecting rod 221, and is used for stirring the material and the water in the cleaning chamber 10.

In one embodiment, as shown in FIGS. 5 and 6, the stirring rod 222 extends in a direction close to the bottom of the inner sidewall of the cleaning chamber 10.

Figure 1:
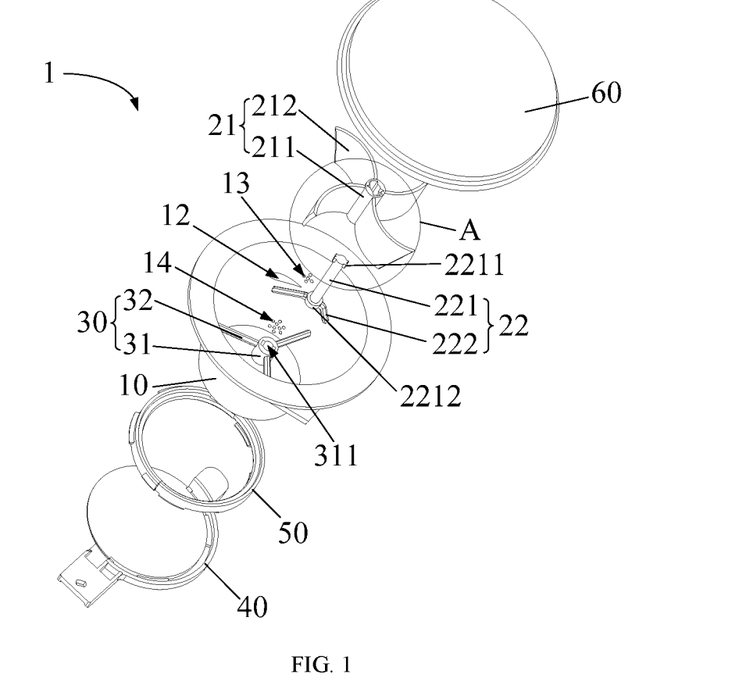
FIG. 1 is an exploded structural diagram of a material cleaning device according to some embodiments of the present disclosure.

In one embodiment, as shown in FIGS. 1, 5 and 6, there are a plurality of stirring rods 222, and the plurality of stirring rods 222 each form a different angle with the connecting rod 221.

In one embodiment, the connecting rod 221 and the stirring rod 222 are a one-piece structure.

In one embodiment, as shown in FIGS. 5 and 6, the connecting rod 221 longitudinally passes through the first connecting hole 311, the upper end of the connecting rod 221 is connected to the rotating member 21, and the lower end of the connecting rod 221 is connected to the stirring rod 222.

In one embodiment, the upper end of the connecting rod 221 protrudes from the first connecting hole 311, the rotating member 21 and the stirring rod 222 are both connected to an upper portion of the connecting rod 221, and the stirring rod 222 is located below the rotating member 21.

Further, as shown in FIGS. 1-6, the rotating member 21 is provided with a second connecting hole 2111, and a sidewall of the second connecting hole 2111 is provided with a limiting groove 2112; a first limiting bump 2211 is formed on the upper end of the connecting rod 221, and the first limiting bump 2211 is inserted into the second connecting hole 2111, is clamped in the limiting groove 2112, and is supported on a groove bottom of the limiting groove 2112, so that the connecting rod 221 is fixedly connected with the rotating member 21.

Further, as shown in FIGS. 1, 2, 3, 5 and 6, the lower end of the connecting rod 221 protrudes from the first connecting hole 311, and the lower end of the connecting rod 221 is formed with a second limiting bump 2212 having a larger cross-sectional area than the first connecting hole 311.

In the above-described embodiments, the stirring member 22 comprises a connecting rod 221 and a stirring rod 222, and the connecting rod 221 is connected to the rotating member 21, realizing the connection between the stirring member 22 and the rotating member 21, and ensuring that the rotating member 21 can drive the stirring member 22 to rotate. Moreover, the connecting rod 221 is partially located in the first connecting hole 311 on the bracket 30, so the rotating member 21 can rotate relative to the bracket 30 with the connecting rod 221 as the shaft, thus effectively ensuring the rotation stability of the rotating member 21 and avoiding deviation and the like, and also ensuring that the stirring rod 222 can rotate stably in the cleaning chamber 10 to rotate and tumble the material and the water relatively regularly. In this way, the function of automatic cleaning is realized, and excessive noise is avoided.

As for the specific connection relationship between the connecting rod 221 and the rotating member 21, the connection may be fixed connection, and in this way, the rotating member 21 and the stirring member 22 can rotate synchronously, so that the stirring member 22 can quickly stir the material and the water, thereby improving the cleaning efficiency of the material cleaning device 1. Of course, the connecting rod 221 may also be movable connected to the rotating member 21, as long as the rotating member 21 can drive the connecting rod 221 to rotate, i.e., the rotation of the stirring member 22, and thus the stirring function, can be realized.

The connecting rod 221 longitudinally passes through the first connecting hole 311, and the upper and lower ends of the connecting rod 221 are connected to the rotating member 21 and the stirring rod, respectively, so that the rotating member 21 and the stirring rod 222 are located on the upper and lower sides of the bracket 30, respectively, specifically with the rotating member 21 being on the upper side, and the stirring rod 222 on the lower side. In this way, on the one hand, the rotating member 21 is prevented from contacting the material and the water, thereby avoiding the resistance caused by the material and the water to the rotation of the rotating member 21; and on the other hand, it is ensured that the stirring rod 222 can contact the material and the water, and further effectively stir the water and the material, so as to ensure the cleaning effect of the material cleaning device 1.

Alternatively, the upper end of the connecting rod 221 protrudes from the first connecting hole 311, the rotating member 21 and the stirring rod 222 are both connected to the upper portion of the connecting rod 221, and the stirring rod 222 is located below the rotating member 21, so that both the rotating member 21 and the stirring rod 222 are located on the upper side of the bracket 30, which is also the case where the rotating member 21 is on the upper side, and the stirring rod 222 is on the lower side. In this way, it is also possible to prevent the rotating member 21 from contacting the material and the water, thereby avoiding the resistance caused by the material and the water to the rotation of the rotating member 21; and further, it can also be ensured that the stirring rod 222 can contact the material and the water, and further effectively stir the water and the material, so as to ensure the cleaning effect of the material cleaning device 1.

The limiting groove 2112 cooperates with the first limiting bump 2211, realizing the fixed connection between the connecting rod 221 and the rotating member 21, which leads to a simple structure and convenient assembly. Specifically, during assembly, the rotating member 21 is supported on the bracket 30, and the second connecting hole 2111 on the rotating member 21 is made to communicate with the first connecting hole 311 on the bracket 30; then the stirring member 22 is installed from bottom to top, so that the connecting rod 221 of the stirring member 22 is inserted into the first connecting hole 311 and the second connecting hole 2111 sequentially from bottom to top; and finally the connecting rod 221 is rotated, so that the first limiting bump 2211 on the connecting rod 221 is clamped in the limiting groove 2112, in this case, the limiting groove 2112 can limit both the rotation of the connecting rod 221 in the second connecting hole 2111 and the downward movement of the connecting rod 221, that is, the limiting groove 2112 not only limits the position of the connecting rod 221, but also supports the connecting rod 221, thereby ensuring the reliable connection between the rotating member 21 and the stirring member 22, ensuring that the rotating member 21 and the stirring member 22 can rotate synchronously, and further improving the use reliability of the device.

The lower end of the connecting rod 221 protrudes from the first connecting hole 311, i.e., whether the stirring rod 222 is connected to the upper portion or the lower portion of the connecting rod 221, the connecting rod 221 always longitudinally passes through the first connecting hole 311, which maximizes the depth of insertion of the connecting rod 221 into the first connecting hole 311, thereby effectively avoiding inclination of the connecting rod 221, etc., and further improving the stability of the stirring member 22 and the rotating member 21 when rotating. The arrangement of the second limiting bump 2212 can limit the upward movement of the connecting rod 221, which further ensures the relative stability between the connecting rod 221 and the bracket 30, thereby further ensuring the stable supporting of the stirring assembly 20 by the bracket 30, and further ensuring the relative stability between the stirring member 22 and the rotating member 21 and ensuring that the stirring member 22 and the rotating member 21 can rotate stably. In addition, for the technical solution in which the stirring rod 222 is connected to the lower end of the connecting rod 221, the stirring rod 222 can be directly connected to the limiting bump, which is simple in structure and is an ingenious design.

The extending of the stirring rod 222 in a direction close to the bottom of the inner sidewall of the cleaning chamber 10 increases the stirring depth and the stirring radius of the stirring rod 222, and effectively increases the stirring range of the stirring rod 222, so that the stirring rod 222 can stir more materials and water, thus further improving the cleaning effect of the material cleaning device 1.

As there are a plurality of stirring rods 222 and the plurality of stirring rods 222 each form a different angle with the connecting rod 221, the plurality of stirring rods 222 each have a different stirring radius, which further increases the material and the water the stirring rod 222 can stir, and enables the material and the water to tumble while rotating, thereby further improving the cleaning effect of the material cleaning device 1.

The connecting rod 221 and the stirring rod 222 are a one-piece structure, which, on the one hand, improves the connection strength between the connecting rod 221 and the stirring rod 222, thereby improving the use reliability of the stirring member 22; and on the other hand, improves the production efficiency of the stirring member 22 and reduces the production cost, as the connecting rod 221 and the stirring rod can be integrally formed.

In some embodiments of the present disclosure, further, as shown in FIGS. 1-8, the bracket 30 comprises: a support column 31 and a support rib 32. Specifically, the stirring assembly 20 is supported by the support column 31, and the first connecting hole 311 is provided in the support column 31; and one end of the support rib 32 is connected to the support column 31 and the other end of the support rib 32 is fixedly connected to the inner sidewall of the cleaning chamber 10.

In one embodiment, as shown in FIGS. 5 and 6, the support column 31, the support rib 32 and the cleaning chamber 10 are a one-piece structure.

In one embodiment, as shown in FIGS. 1-6, there are a plurality of support ribs 32, and the plurality of support ribs 32 are uniformly distributed in a circumferential direction of the support column 31.

In the above-described embodiments, the bracket 30 comprises a support column 31 and a support rib 32. The support column 31 is capable of supporting the rotating member 21, thereby realizing the supporting function of the bracket 30; the first connecting hole 311 is provided in the support column 31, and the connecting rod 221 is partially located in the first connecting hole 311, ensuring that the rotating member 21 can rotate relative to the bracket 30 with the connecting rod 221 as the shaft, thereby ensuring the reliable connection between the stirring assembly 20 and the bracket 30; and one end of the support rib 32 is connected to the support column 31 and the other end thereof is fixedly connected to the inner sidewall of the cleaning chamber 10, realizing the fixed connection between the bracket 30 and the cleaning chamber 10.

The support column 31, the support rib 32 and the cleaning chamber 10 are a one-piece structure, which, on the one hand, improves the connection strength between the support column 31 and the support rib 32 and the connection strength between the support rib 32 and the cleaning chamber 10, and reduces the probability that the bracket 30 will fall off or break, thereby further improving the use reliability of the material cleaning device 1; and on the other hand, improves the production efficiency of the product and reduces the production cost of the product, as the support column 31, the support rib 32 and the cleaning chamber 10 can be integrally formed.

There are a plurality of support ribs 32, and the plurality of support ribs 32 are uniformly distributed in a circumferential direction of the support column 31, which further improves the strength and supporting stability of the bracket 30.

In some embodiments of the present disclosure, as shown in FIGS. 1-6, further, the rotating member 21 comprises: a connecting column 211 and a blade 212, wherein the connecting column 211 is connected to the stirring member 22 and capable of being supported by the bracket 30; and the blade 212 is connected to the connecting column 211 and capable of converting wind energy into mechanical energy to enable the rotating member 21 to rotate relative to the bracket 30.

In one embodiment, as shown in FIGS. 1-6, there are a plurality of blades 212, and the plurality of blades 212 are uniformly distributed in a circumferential direction of the connecting column 211.

Figure 2:
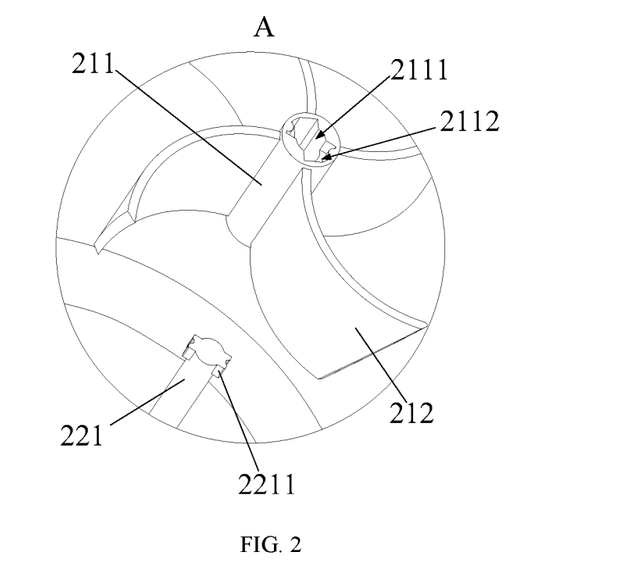
FIG. 2 is an enlarged schematic view of part A in FIG. 1.
Figure 3:
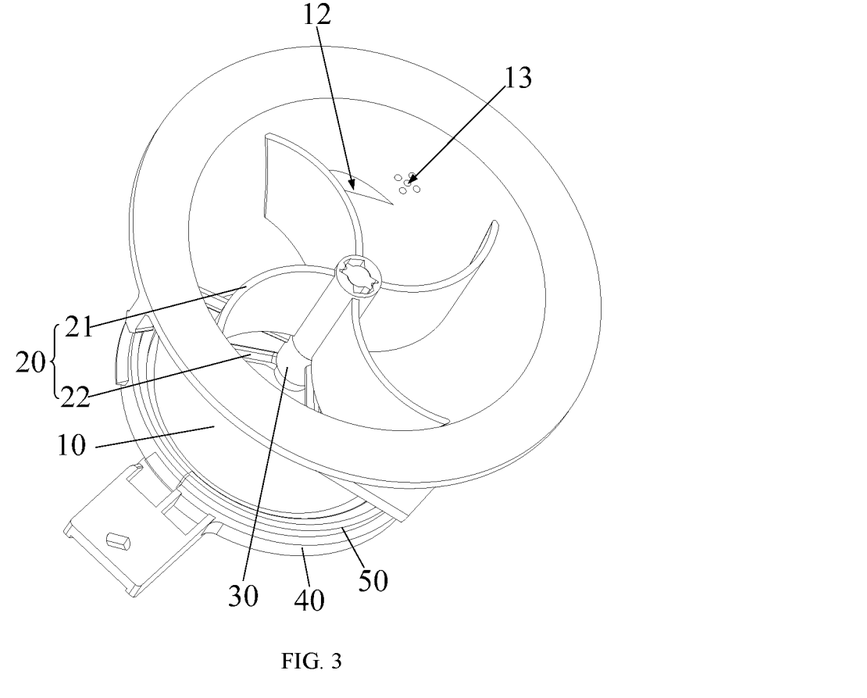
FIG. 3 is a schematic view of the assembly structure of the material cleaning device (without the cleaning cover) shown in FIG. 1.
Figure 4:
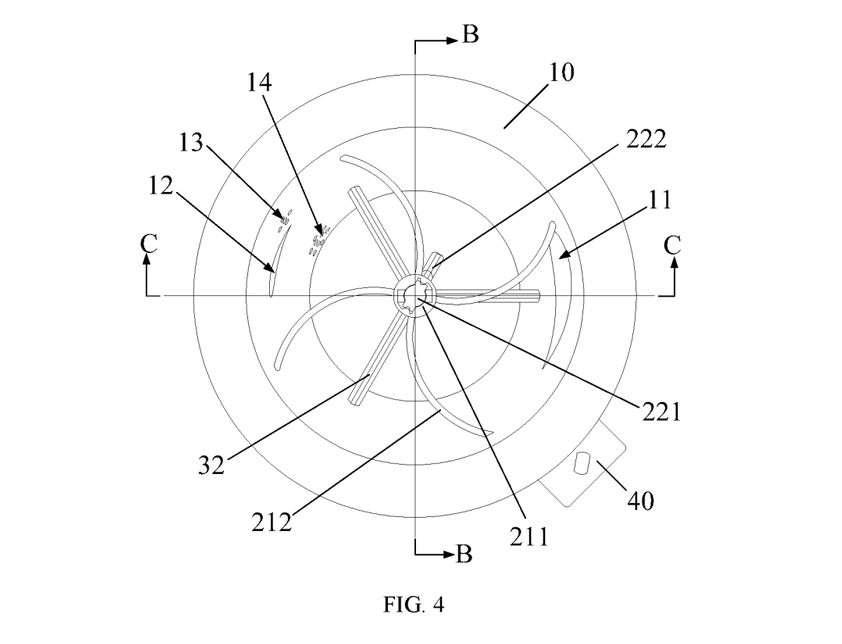
FIG. 4 is a schematic top view of the material cleaning device shown in FIG. 3.

In one embodiment, as shown in FIGS. 1-3, a windward side of the blade 212 is a cambered surface. In one embodiment, as shown in FIGS. 5 and 6, the connecting column 211 and the blades 212 are a one-piece structure.

In the above-described embodiments, the rotating member 21 comprises a connecting column 211 and a blade 212, and the connecting column 211 is connected to the stirring member 22 and is supported by the bracket 30, realizing the assembly relationship between the rotating member 21 and the bracket 30 and between the rotating member 21 and the stirring member 22; and the blade 212 is connected to the connecting column 211 and can convert wind energy into mechanical energy, realizing the air stream driving function of the rotating member 21.

There are a plurality of blades 212, ensuring that the rotating member 21 can rotate continuously and efficiently; and the plurality of blades 212 are uniformly distributed in a circumferential direction of the connecting column 211, effectively ensuring the rotation stability of the rotating member 21. The windward side of the blade 212 is a cambered surface, which increases the area of the blade 212 and thereby increases the rotational speed of the blade 212.

In one embodiment of the present disclosure, as shown in FIGS. 1-4, one end of the blade 212 away from the connecting column 211 is bent towards the windward side of the blade 212, so that the windward side of the blade 212 is a cambered surface.

In this embodiment, one end of the blade 212 away from the connecting column 211 is bent towards the windward side of the blade 212, enabling each part of the windward side to effectively receive the blowing of the air streams, and reducing the air resistance received by the blade 212 when rotating, thereby further improving the rotational speed of the blade 212.

Figure 12:
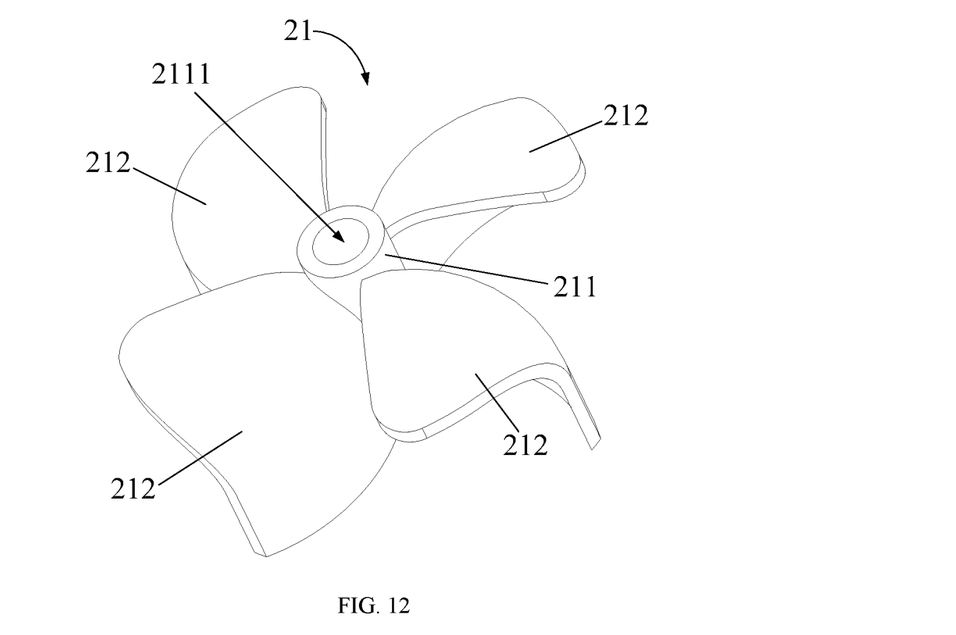
FIG. 12 is a three-dimensional structural diagram of a rotating member according to other embodiments of the present disclosure.
Figure 13:
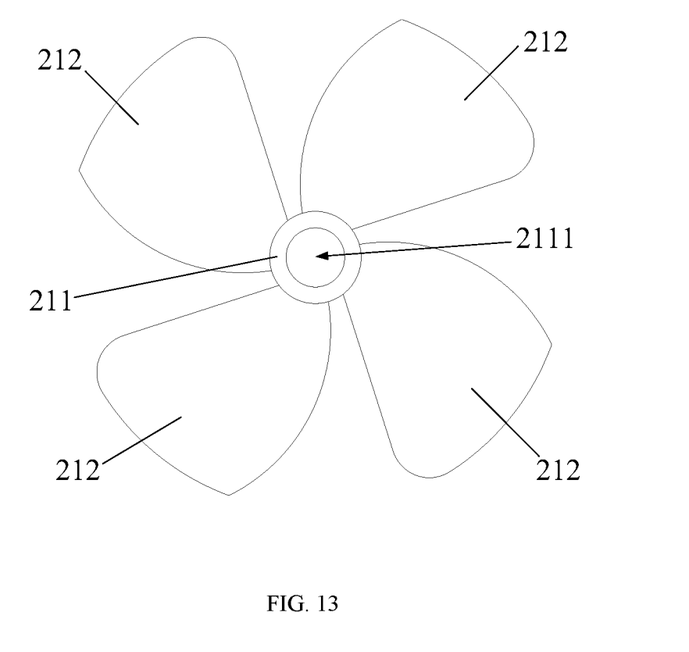
FIG. 13 is a schematic top view of the rotating member shown in FIG. 12.
Figure 14:
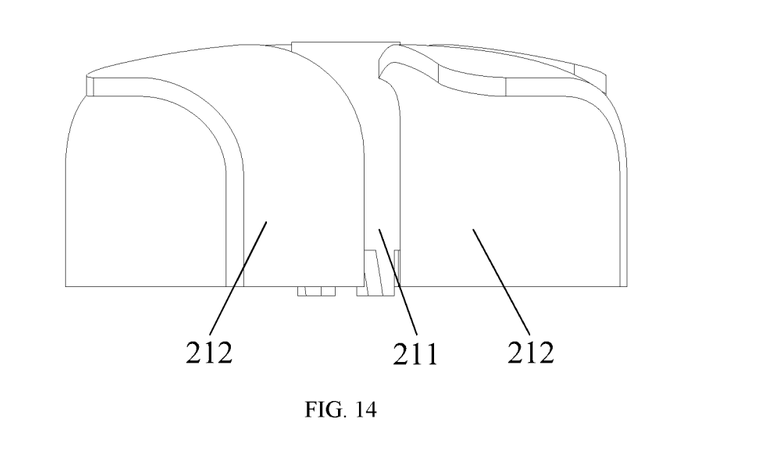
FIG. 14 is a schematic front view of the rotating member shown in FIG. 12.

In another embodiment of the present disclosure, as shown in FIGS. 12-14, one end of the blade 212 away from the connecting column 211 and the upper end of the blade 212 are both bent towards the windward side of the blade 212.

In this embodiment, one end of the blade 212 away from the connecting column 211 is bent towards the windward side of the blade 212, enabling each part of the windward side to effectively receive the blowing of the air streams, and reducing the air resistance received by the blade 212 when rotating, thereby further improving the rotational speed of the blade 212; and the upper end of the blade 212 is bent towards the windward side of the blade 212, which can have certain guiding effect, so that the air streams on the upper portion of the blade 212 can be deflected downwardly and exert certain impact on the material, thereby further improving the working efficiency of the material cleaning device 1.

The connecting column 211 and the blades 212 are a one-piece structure, forming an impeller structure, which improves the connection strength between the connecting column 211 and the blades 212, and further improves the use reliability of the rotating member 21. Moreover, the connecting column 211 and the blades 212 can be integrally formed, thereby improving the production efficiency of the rotating member 21 and reducing the production cost.

In some embodiments of the present disclosure, as shown in FIGS. 1, 4, 5 and 6, further, the bottom of the cleaning chamber 10 is provided with a material outlet; and the material cleaning device 1 further comprises a valve 40 connected to the cleaning chamber 10 and movable relative to the cleaning chamber 10 to close or open the material outlet.

In one embodiment, as shown in FIG. 1, the bottom of the cleaning chamber 10 is completely opened to form the material outlet.

Further, as shown in FIGS. 1, 3, 5 and 6, a sealing member for sealing the material outlet is further provided between the valve 40 and the cleaning chamber 10.

In one embodiment, as shown in FIG. 3, the sealing member is a sealing ring 50.

Further, as shown in FIGS. 1-10, the top of the cleaning chamber 10 is completely open; and the material cleaning device 1 further comprises a cleaning cover 60 being capable of covering the cleaning chamber 10 so as to close the cleaning chamber 10, as shown in FIG. 1.

In the above-described embodiments, the arrangement of the material outlet and the valve 40 facilitates the automatic discharge after the completion of material cleaning, thereby further improving the automation degree of the material cleaning device 1 and further increasing the market competitiveness of the product. Specifically, in the cleaning process, the valve 40 is kept closed, and the material and the water rotate and tumble in the cleaning chamber 10 to realize automatic cleaning; and after the completion of the cleaning, the valve 40 moves relative to the cleaning chamber 10 to open the material outlet, and the material is discharged through the material outlet under the action of gravity to realize automatic discharge.

The bottom of the cleaning chamber 10 is completely opened to form the material outlet, which maximizes the size of the material outlet, thereby significantly increasing the material discharge speed of the material cleaning device 1.

The arrangement of the sealing member effectively ensures the sealing connection between the valve 40 and the cleaning chamber 10, thereby preventing the air streams or water from leaking to the outside through the joint between the valve 40 and the cleaning chamber 10, and further improving the use reliability of the device.

The sealing member is a sealing ring 50, and the sealing ring 50 is reliable in sealing and low in price.

The top of the cleaning chamber 10 is completely open, facilitating the assembly, repair and replacement of the stirring assembly 20.

In some embodiments of the present disclosure, as shown in FIGS. 1-10, the air inlet coincides with the material inlet 11 or the water inlet 12.

In the above-described embodiments, the air inlet coincides with the material inlet 11 or the water inlet 12, that is, the air inlet shares a single inlet with the material inlet 11, or the air inlet shares a single inlet with the water inlet 12, which simplifies the structure of the cleaning chamber 10 and is beneficial to product cost saving.

It should be explained that, since the material cleaning device 1 of the present disclosure mainly utilizes air streams to drive the stirring assembly 20 to rotate so as to realize the stirring of the material and the water, there is no strict requirement on the order of the transport of the material and the water into the cleaning chamber 10, and it is only required that after the material and the water are transported into the cleaning chamber 10, air streams can enter the cleaning chamber 10 and drive the stirring assembly 20 to rotate; and as to whether the air streams are transported therein through a special air inlet, through the material inlet 11 (i.e. the air inlet shares a single inlet with the material inlet 11), or through the water inlet 12 (i.e. the air inlet shares a single inlet with the water inlet 12), it makes no difference, and they can all achieve the object of the present disclosure.

It should be noted that, for the embodiment in which the air inlet shares a single inlet with the material inlet 11, pneumatic feeding can also be realized, i.e., the material is fed into the cleaning chamber 10 by means of the air streams, which has high feeding efficiency, and is clean and pollution-free. For the order of transport of the air streams and the material, it is feasible to first transport the material through the material inlet 11, and then transport the air streams through the material inlet 11 for cleaning; and it is also feasible to transport the material and the air streams simultaneously, i.e., the material is transported into the cleaning chamber 10 under the action of the air streams, and then the water and the material rotate and tumble under the action of the air streams to realize automatic cleaning. The latter is preferable, and in this way, in the process of transporting the material into the cleaning chamber 10 under the action of the air streams, tumbling and rubbing will also occur to the material under the action of the air streams, so that particles such as starch adhered to the surface of the material will partially fall off, i.e., the air stream feeding has certain dry cleaning effect on the material, thereby further improving the material cleaning effect of the material cleaning device 1.

In some embodiments of the present disclosure, as shown in FIGS. 1, 3, 6, 7, 8, 9 and 10, further, the cleaning chamber 10 is further provided with an air outlet 13 and a water outlet 14.

In one embodiment, as shown in FIGS. 1, 3, 6, 7, 8, 9 and 10, the air outlet 13 is porous.

In one embodiment, as shown in FIGS. 1, 3, 6, 7, 8, 9 and 10, the water outlet 14 is porous.

In one embodiment, as shown in FIGS. 1, 3, 6, 7, 8, 9 and 10, the air inlet, the water inlet 12, the air outlet 13 and the water outlet 14 are all provided on the sidewall of the cleaning chamber 10.

In one embodiment, as shown in FIGS. 1, 3, 6, 7, 8, 9 and 10, the material inlet 11 is located at the upper portion of the cleaning chamber 10.

In the above-described embodiments, the arrangement of the air outlet 13 can prevent the air pressure in the cleaning chamber 10 from being too high, so that high-pressure air streams can be continuously introduced into the cleaning chamber 10, thereby ensuring the cleaning effect of the device. The arrangement of the water outlet 14 makes it convenient to automatically discharge the water after the completion of the cleaning, and the water outlet 14 is kept in the closed state during the cleaning process, which not only can prevent loss of the air streams, but also can avoid the use of a large amount of water.

The air outlet 13 is porous, and the pore diameter of the air outlet 13 is smaller than the particle diameter of the material in the cleaning chamber 10, which not only ensures normal air exhaust of the cleaning chamber 10, but also prevents the material from being discharged from the air outlet 13, thus further improving the use reliability of the device. The water outlet 14 is porous, and the pore diameter of the water outlet 14 is smaller than the particle diameter of the material in the cleaning chamber 10, which not only ensures normal water drainage of the cleaning chamber 10, but also prevents the material from being discharged from the water outlet 14. The air inlet, the water inlet 12, the air outlet 13 and the water outlet 14 are all provided on the sidewall of the cleaning chamber 10, which is simple in structure, facilitates the overhaul of the device and also does not affect automatic material discharge of the device. The material inlet 11 is located at the upper portion of the cleaning chamber 10, which can prevent the water in the cleaning chamber 10 from pouring into the material inlet 11. In the specific use process, at the time of cleaning the material, the air outlet 13 is opened and the water outlet 14 is closed so as to reduce the loss of air streams, and use of a large amount of water can also be avoided; and when cleaning has been completed, the air outlet 13 is closed and the water outlet 14 is opened, so that the water can be discharged under the action of gravity and the air streams.

Figure 11:
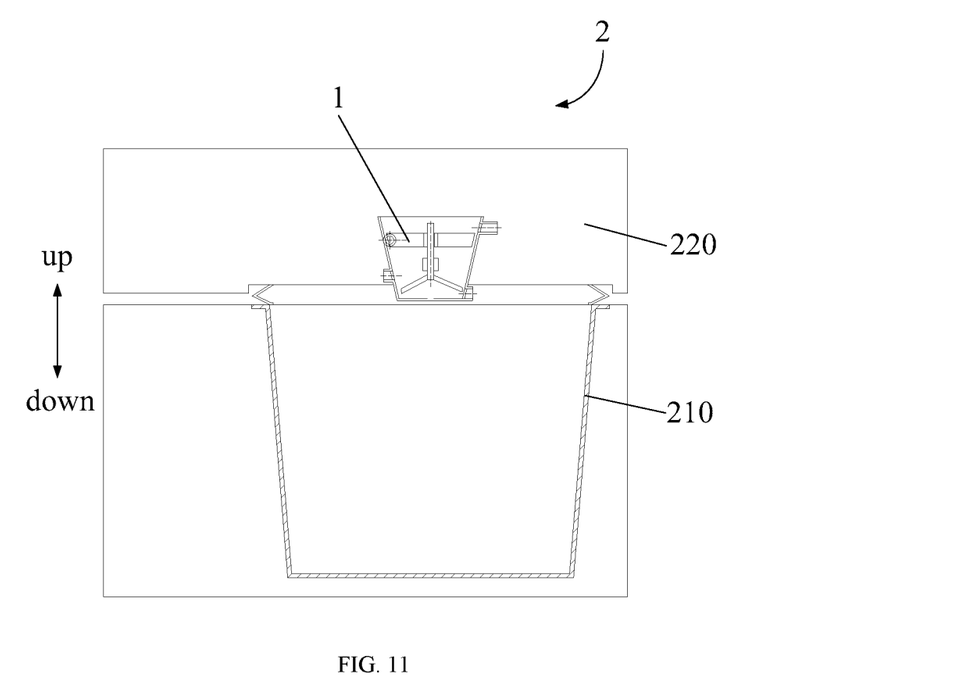
FIG. 11 is a schematic structural view of an electric cooker according to some embodiments of the present disclosure.

As shown in FIG. 11, a cooking appliance provided in an embodiment of the second aspect of the present disclosure comprises the material cleaning device 1 as described in any of the embodiments of the first aspect.

The cooking appliance provided in the embodiment of the second aspect of the present disclosure comprises the material cleaning device 1 as described in any of the embodiments of the first aspect, and therefore has all the advantageous effects of any of the above-described embodiments, which will not be repeated here.

In the above, as shown in FIG. 11, the cooking appliance further comprises: a pot body 210 and a cover body 220, the cover body 220 being capable of covering the pot body 210 so as to form a cooking chamber, wherein the material cleaning device 1 is provided on the cover body 220 and used for cleaning a material fed into the cleaning chamber 10 thereof, and feeding the cleaned material into the cooking chamber.

The cooking appliance comprises a pot body 210, a cover body 220 and the material cleaning device 1, then after cleaning the material, the material cleaning device 1 can directly feed the material into the cooking chamber, thereby effectively improving the intellectualization degree and the automation degree of the cooking appliance, and further improving the use experience of the user.

Specifically, the cooking appliance is an electric cooker 2.

Taking the case as an example where the material is rice, and the air inlet shares the same inlet with the material inlet 11, the working principle of material cleaning of the electric cooker 2 is as follows: the material inlet 11, the water inlet 12 and the air outlet 13 are opened, the water outlet 14 and the material outlet are closed, the rice enters the cleaning chamber 10 through the material inlet 11 under the action of air streams, at the same time, the rotating member 21 rotates under the action of the air streams and drives the stirring member 22 to rotate, and the stirring member 22 causes the rice to tumble in the cleaning chamber 10; water enters the cleaning chamber 10 from the water inlet 12, at this time, air streams continuously enter the cleaning chamber 10 through the material inlet 11, but no material enters the cleaning chamber 10 through the material inlet 11, the air streams continuously act on the rotating member 21, such that the rotating member 21 drives the stirring member 22 to rotate continuously to clean the material; after cleaning has been completed, the water outlet 14 is opened, the air outlet 13 is closed, and the rice cleaning water in the cleaning chamber 10 is discharged from the water outlet 14 under the action of gravity and air streams; after the rice cleaning water in the washing chamber 10 has been drained, the water outlet 14 is closed and the valve 40 is opened, then the rice in the cleaning chamber 10 flows into the inner pot of the electric cooker 2, at the same time, a predetermined amount of water (the amount is determined in accordance with the correct ratio of water to rice) starts to enter the inner pot through the water inlet 12, and the rotating member 21 that is rotating disperses the water around to wash the inner sidewall of the cleaning chamber 10 to ensure that the rice completely enters the inner pot; at this time, a single round of rice feeding, rice cleaning and addition of a predetermined amount of water has been completed; and the above-described operations may be repeated multiple times according to the rice quantity requirement during rice cooking, so as to achieve the rice quantity and water quantity required for the whole rice cooking process.

Of course, the cooking appliance is not limited to an electric cooker 2, but may also be an electric pressure cooker or other cooking appliances, and may further be extended to the soybean milk machine, the food processing industry, the chemical industry, the oil refining industry, the animal husbandry, the agricultural automatic spraying, medical industry and other fields.

In summary, for the material cleaning device provided by the present disclosure, the stirring assembly is driven to rotate by means of air streams, so as to stir the material and the water in the cleaning chamber, thereby implementing automatic cleaning, which is an ingenious design, is simple in structure, and is easy to use. Specifically, the cleaning chamber is provided with a material inlet and a water inlet, air flows and a material to be cleaned are transported to the cleaning chamber through the material inlet, water for cleaning the material is transported to the cleaning chamber through the water inlet, then the materials such as rice and water can rotate and tumble under the action of the stirring assembly, thus achieving the object of automatic cleaning, which leads to good cleaning effect, and is simple in structure.

In the present disclosure, the terms "first" and "second" are used for descriptive purposes only and cannot be construed as indicating or implying relative importance; and the term "a plurality of" means "two or more", unless expressly defined otherwise. The terms "mounting", "linking", "connection", "fixation" and the like should be broadly defined, for example, the "connection" may be a fixed connection, may also be a detachable connection, or an integral connection; and the "linking" may refer to direct connection and may also refer to indirect connection through an intermediate medium.

In the description of the present disclosure, it is to be understood that the orientation or position relation denoted by the terms such as "upper" and "lower" is based on the orientation or position relation indicated by the figures, which only serves to facilitate describing the present disclosure and simplify the description, rather than indicating or suggesting that the device or unit referred to may have a particular orientation, and is constructed and operated in a particular orientation, and therefore cannot be construed as a limitation on the present disclosure.

In the description of the present specification, the description of the terms "one embodiment", "some embodiments", "specific embodiments" and the like means that a particular feature, structure, material or characteristic described in combination with the embodiment or example is included in at least one embodiment or example of the present disclosure. In the present specification, the schematic representation of the above terms does not necessarily refer to the same embodiment or example. Furthermore, the particular features, structures, materials or characteristics described may be combined in a suitable manner in any one or more embodiments or examples.

What is claimed is:

1. A material cleaning device, comprising:
a cleaning chamber, which is provided with an air inlet, a material inlet, and a water inlet, the air inlet, the material inlet, and the water inlet configured to transport air flow, a material to be cleaned, and water for cleaning the material to the cleaning chamber;
a stirring assembly provided in the cleaning chamber and configured to rotate in the cleaning chamber under action of air streams, wherein the material and the water is stirred in the cleaning chamber; and
a bracket disposed in the cleaning chamber and fixedly connected to an inner sidewall of the cleaning chamber, and configured to support the stirring assembly, wherein the stirring assembly is rotatable relative to the bracket;
wherein the stirring assembly comprises:
a rotating member disposed in the cleaning chamber and configured to rotate in the cleaning chamber under the action of the air stream; and
a stirring member disposed in the cleaning chamber, connected to the rotating member and configured to rotate in the cleaning chamber under driving of the rotating member wherein the material and the water are stirred in the cleaning chamber.

2. The material cleaning device according to claim 1, wherein
the bracket is provided with a first connecting hole; and
the stirring member comprises:
a connecting rod partially located in the first connecting hole and rotatable in the first connecting hole, the connecting rod being connected to the rotating member, wherein the rotating member is configured to rotate relative to the bracket with the connecting rod as a shaft; and
a stirring rod connected to the connecting rod, extending in a different direction from the connecting rod, and configured to stir the material and the water in the cleaning chamber.

3. The material cleaning device according to claim 2, wherein
the connecting rod longitudinally passes through the first connecting hole, and upper and lower ends of the connecting rod are connected to the rotating member and the stirring rod, respectively; or
an upper end of the connecting rod protrudes from the first connecting hole, the rotating member and the stirring rod are both connected to an upper portion of the connecting rod, and the stirring rod is located below the rotating member.

4. The material cleaning device according to claim 3, wherein
the rotating member is provided with a second connecting hole, and a sidewall of the second connecting hole is provided with a limiting groove; and
a first limiting bump is formed on the upper end of the connecting rod, and the first limiting bump is inserted into the second connecting hole, is clamped in the limiting groove, and is supported on a groove bottom of the limiting groove, wherein the connecting rod is fixedly connected with the rotating member.

5. The material cleaning device according to claim 3, wherein
the lower end of the connecting rod protrudes from the first connecting hole, and the lower end of the connecting rod is formed with a second limiting bump having a larger cross-sectional area than the first connecting hole.

6. The material cleaning device according to claim 2, wherein
the stirring rod extends in a direction close to the bottom of the inner sidewall of the cleaning chamber.

7. The material cleaning device according to claim 6, further comprising:
a plurality of stirring rods, wherein the plurality of stirring rods each form a different angle with respect to the connecting rod.

8. The material cleaning device according to claim 2, wherein the bracket comprises:
a support column, by which the stirring assembly is supported and in which the first connecting hole is provided; and
a support rib having one end connected to the support column and the other end fixedly connected to the inner sidewall of the cleaning chamber.

9. The material cleaning device according to claim 8, wherein,
the support column, the support rib and the cleaning chamber are a one-piece structure; or
a plurality of support ribs are uniformly distributed in a circumferential direction of the support column.

10. The material cleaning device according to claim 1, wherein the rotating member comprises:
a connecting column connected to the stirring member configured to be supported by the bracket; and
a blade connected to the connecting column and configured to cover wind energy into mechanical energy to enable the rotating member to rotate relative to the bracket.

11. The material cleaning device according to claim 10, further comprising:
a plurality of blades, wherein the plurality of blades are uniformly distributed in a circumferential direction of the connecting column; or
a windward side of the blade is a cambered surface.

12. The material cleaning device according to claim 1, wherein
the bottom of the cleaning chamber is provided with a material outlet; and
the material cleaning device further comprises a valve connected to the cleaning chamber and movable relative to the cleaning chamber to close or open the material outlet, wherein the bottom of the cleaning chamber is completely opened to form the material outlet.

13. The material cleaning device according to claim 12, wherein,
a sealing member for sealing the material outlet is further provided between the valve and the cleaning chamber, and wherein the sealing member is a sealing ring.

14. The material cleaning device according to claim 1, wherein
a top of the cleaning chamber is completely open; and
the material cleaning device further comprises a cleaning cover configured to cover the cleaning chamber to close the cleaning chamber.

15. The material cleaning device according to claim 1, wherein
the air inlet coincides with the material inlet or the water inlet.

16. The material cleaning device according to claim 1, wherein
- the cleaning chamber is further provided with an air outlet and a water outlet, wherein
- the air outlet is porous; or
- the water outlet is porous; or
- the air inlet, the water inlet, the air outlet and the water outlet are all provided on the sidewall of the cleaning chamber; or
- the material inlet is located at the upper portion of the cleaning chamber.

* * * * *